United States Patent
Tjiptahardja et al.

(10) Patent No.: US 7,118,076 B2
(45) Date of Patent: Oct. 10, 2006

(54) SATELLITE COMPRISING MEANS FOR TRANSFERRING HEAT FROM A SHELF SUPPORTING EQUIPMENT TO RADIATOR PANELS

(75) Inventors: Tisna Tjiptahardja, Cannes la Bocca (FR); Marcel Amidieu, Ponteilla (FR); Gérard Cluzet, Mandelieu (FR)

(73) Assignee: Alcatel, Paris (FR)

( * ) Notice: Subject to any disclaimer, the term of this patent is extended or adjusted under 35 U.S.C. 154(b) by 14 days.

(21) Appl. No.: 10/787,131

(22) Filed: Feb. 27, 2004

(65) Prior Publication Data
US 2004/0232284 A1 Nov. 25, 2004

(30) Foreign Application Priority Data
Apr. 15, 2003 (FR) .................... 03 04687

(51) Int. Cl.
*B64G 1/58* (2006.01)
(52) U.S. Cl. ................. 244/171.8; 244/173.1
(58) Field of Classification Search ............ 244/158 R, 244/163, 158 A
See application file for complete search history.

(56) References Cited

U.S. PATENT DOCUMENTS

| 4,899,810 A | * | 2/1990 | Fredley | ................. 165/41 |
| 5,699,982 A | | 12/1997 | Daugherty | |
| 5,806,803 A | * | 9/1998 | Watts | .................. 244/163 |
| 6,073,887 A | | 6/2000 | Hosick | |
| 6,478,258 B1 | * | 11/2002 | Yee | ................. 244/163 |

FOREIGN PATENT DOCUMENTS

| EP | 0 776 827 A1 | 6/1997 |
| EP | 0 780 295 A2 | 6/1997 |
| EP | 0 780 301 A1 | 6/1997 |

* cited by examiner

*Primary Examiner*—Peter M. Poon
*Assistant Examiner*—T. D. Collins
(74) *Attorney, Agent, or Firm*—Sughrue Mion, PLLC

(57) ABSTRACT

A satellite, in particular a telecommunication satellite, comprises a structure having a north face and a south face that are oriented perpendicularly to the rotation axis of the Earth and an east face and a west face that are periodically exposed to solar radiation as the satellite orbits the Earth. The structure supports equipment dissipating heat, the north, south, east and west faces constituting radiator panels that radiate into space heat dissipated by the equipment. The satellite comprises at least one shelf to support the equipment and a heat transfer for transferring heat dissipated by the equipment to the north, south, east and west radiator panels and comprising at last one capillary pumped two-phase fluid loop comprising at least one evaporator thermally connected to the equipment supported by the shelf, a heat exchange fluid circulation branch being associated with each of the north, south, east and west faces, and each branch comprising a heat exchange fluid condenser thermally connected to the face with which that branch is associated.

17 Claims, 6 Drawing Sheets

SATELLITE COMPRISING MEANS FOR TRANSFERRING HEAT FROM A SHELF SUPPORTING EQUIPMENT TO RADIATOR PANELS

CROSS-REFERENCE TO RELATED APPLICATIONS

This application is based on French Patent Application No. 03 04 687 filed Apr. 15, 2003, the disclosure of which is hereby incorporated by reference thereto in its entirety, and the priority of which is hereby claimed under 35 U.S.C. § 119.

BACKGROUND OF THE INVENTION

1. Field of the Invention

The invention relates to a satellite, in particular a telecommunication satellite, intended to be placed in a geostationary orbit, and comprising a structure having a north face and a south face oriented perpendicularly to the rotation axis of the Earth and an east face and a west face that are periodically exposed to solar radiation as the satellite orbits the Earth, said structure supporting equipment dissipating heat, the north, south, east and west faces constituting radiator panels that radiate the heat dissipated by the equipment into space.

2. Description of the Prior Art

Telecommunication satellites are used to transmit diverse signals (audio, video, data, etc.) from one point on the globe to another. They carry a payload consisting primarily of electronic equipment that dissipates excess heat that must be rejected into the surrounding vacuum by radiation.

It is conventional to use the N/S faces as radiator panels to dissipate the excess heat, because these panels are at the lowest temperatures. Because of the equatorial orbit of the satellite, the solar energy is at a minimum on the N/S faces, whereas the other four faces are exposed directly to solar radiation during a portion of the orbit of the satellite around the Earth. The N/S panels can be thermally coupled to reduce temperature fluctuations and improve heat rejection.

However, as there is a requirement to increase the payload of new generation satellites, the capacity of the N/S panels is no longer sufficient. It is for this reason that attempts have been made to increase the heat rejection capacity.

To this end, U.S. Pat. No. 6,073,887 (Loral Inc.) proposes using the E/W faces as radiator panels in addition to the N/S panels. As these faces are exposed to strong variations of solar radiation during an orbit of the satellite around the Earth, the above document teaches coupling them thermally by means of heat pipes to reduce the temperature variations, which can be further reduced by feeding heat to the points at the lowest temperatures by simultaneously coupling the east/west/Earth/anti-Earth faces by means of looped heat pipes. Equipment is mounted directly on the east and west faces and possibly also on the Earth and anti-Earth faces.

In a system of the above type, the temperature of the equipment depends directly on the temperature of the radiator panels with which it is in contact, so that it is necessary to dedicate a greater or lesser proportion of the heat rejection capacity of the satellite to cooling the panels exposed to solar radiation. This reduces the rejection capacity available for the equipment. Furthermore, it is necessary to heat the radiator panels at certain times, to reduce the equipment temperature variations, and this increases the average operating temperature of the equipment.

SUMMARY OF THE INVENTION

The present invention remedies the above drawbacks and consists in a satellite, in particular a telecommunication satellite, intended to be placed in a geostationary orbit, and comprising a structure having a north face and a south face oriented perpendicularly to the rotation axis of the Earth and an east face and a west face that are periodically exposed to solar radiation as the satellite orbits the Earth, the structure supporting equipment dissipating heat, the north, south, east and west faces constituting radiator panels that radiate into space heat dissipated by the equipment, and the satellite comprising at least one shelf to support the equipment and heat transfer means for transferring heat dissipated by the equipment to the north, south, east and west radiator panels.

In this kind of system, the equipment is not in direct contact with the north, south, east and west panels. Consequently, the temperature of the faces exposed to solar radiation can rise without the temperature of the equipment being automatically affected by this. The cold panels (the north and south panels, and the panel opposite the panel exposed to the solar radiation) are preferably used to cool the equipment. All of the rejection capacity of the radiating panels is therefore used to cool the equipment.

The heat transfer means preferably comprise at least one capillary pumped two-phase fluid loop.

The fluid loop advantageously comprises at least one evaporator having an inlet and an outlet for a heat exchange fluid thermally connected to the equipment supported by the shelf, and a heat exchange fluid circulation branch having one end connected to the inlet and one end connected to the outlet of the evaporator associated with each of the north, south, east and west faces, each branch comprising a heat exchange fluid condenser thermally connected to the face with which the branch is associated.

With this kind of loop, the condensers are in parallel with the evaporator(s). The vapor is condensed efficiently in the condensers of the colder branches and with a very low efficiency in the branch for the hottest face (facing the sun).

Each heat exchange fluid circulation branch advantageously comprises an isolator at the outlet of its condenser to block uncondensed vapor.

By complying with a few simple layout rules, the satellite equipped with this type of fluid loop can undergo vacuum-thermal ground tests in any position.

The satellite may comprise a plurality of shelves for supporting equipment and a fluid loop for each shelf.

Other features and advantages of the invention will become more apparent on reading the following description with reference to the appended drawings of embodiments of the invention provided by way of illustrative example.

DETAILED DESCRIPTION OF THE PREFERRED EMBODIMENT

Figure 1:
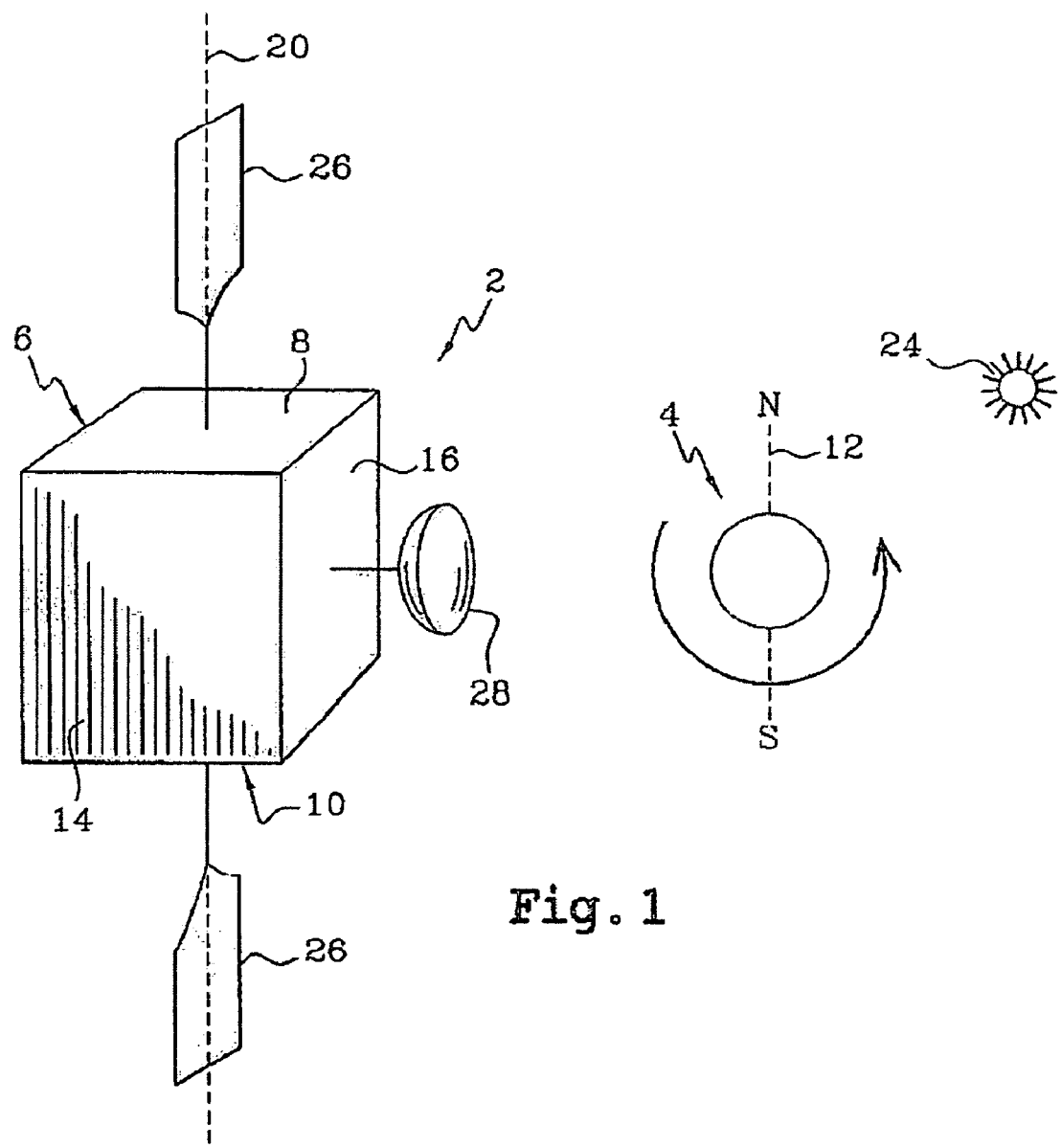
FIG. 1 is a perspective general view of a telecommunication satellite.

FIG. 1 shows a telecommunication satellite 2 in geostationary equatorial orbit around the Earth 4. The satellite has attitude control means for maintaining it in the position shown. The satellite has a parallelepipedal structure 6 with six faces, namely a north face 8 and a south face 10 perpendicular to the rotation axis 12 of the Earth, an east face 14 and a west face 15 (visible in FIG. 2), an Earth face 16 and an anti-Earth face 17 (visible in FIG. 2). A north-south axis 20 passing through the center of the structure 6 and perpendicular to the north and south faces is maintained parallel to the rotation axis of the Earth. The sun 24 is situated at a great distance. Also shown are solar panels 26 perpendicular to the north face 8 and the south face 10 that supply the satellite with electrical energy and a telecommunication antenna 28 pointed toward the Earth.

Figure 2:
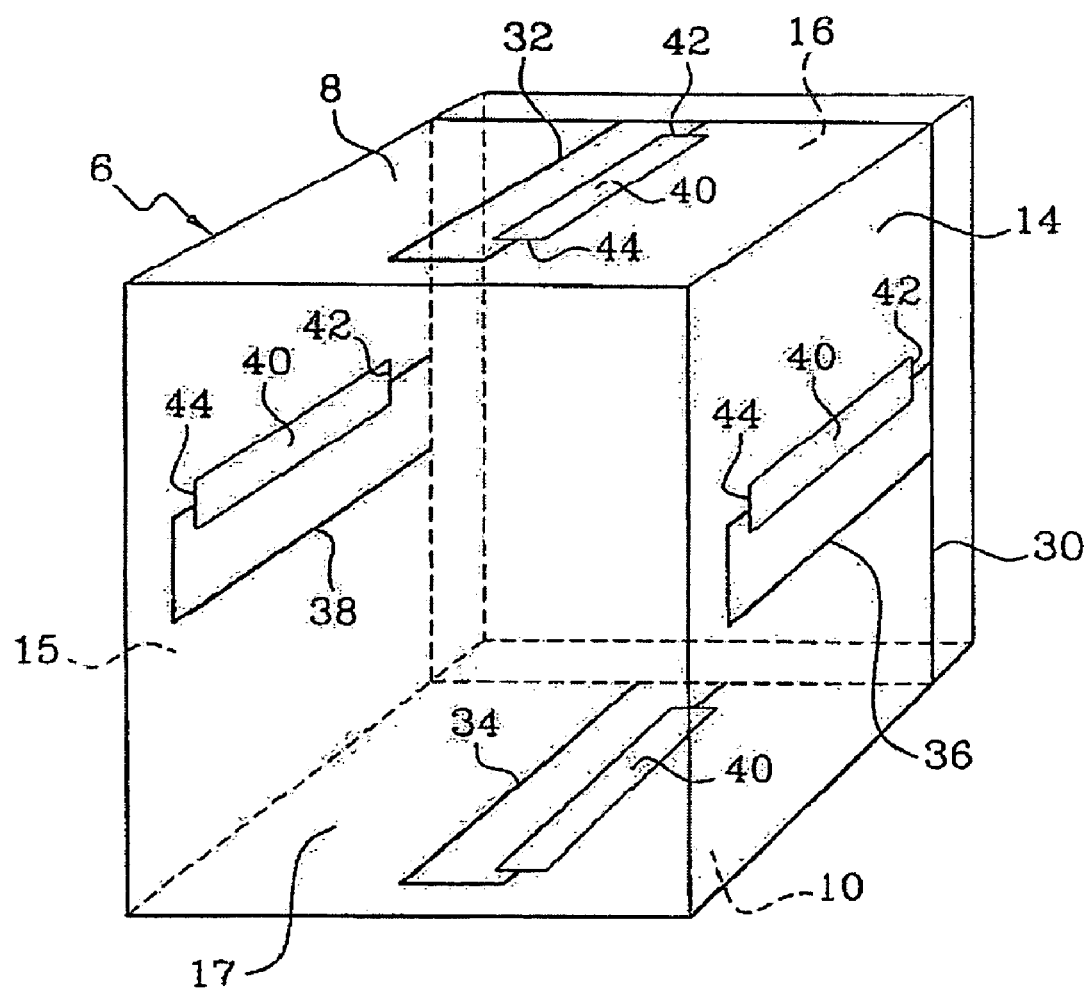
FIG. 2 is a diagrammatic perspective view of the satellite structure.

FIG. 2 is a perspective view of the structure 6 of the FIG. 1 satellite. Note the presence of a shelf 30 within the volume delimited by the six faces 8, 10, 14, 15, 16 and 17. In the embodiment shown, the shelf is parallel to the Earth face 16. However, other dispositions of the shelf may be envisaged without departing from the scope of the invention. The shelf supports equipment, generally electronic equipment (not shown), which dissipates excess heat which must be rejected into space. To this end, the structure of the satellite includes means for transferring excess heat from the equipment to the north, south, east and west faces. Those means advantageously comprise a fluid loop that includes one or more evaporators, to be described hereinafter, in thermal contact with the shelf 30, and at least one condenser 40 in contact with each of the north, south, east and west faces. The condensers 40 are in four branches 32, 34, 36 and 38 of the fluid loop respectively associated with the north, south, east and west faces. They have an inlet 42 and an outlet 44 for a heat exchange fluid.

Figure 3:
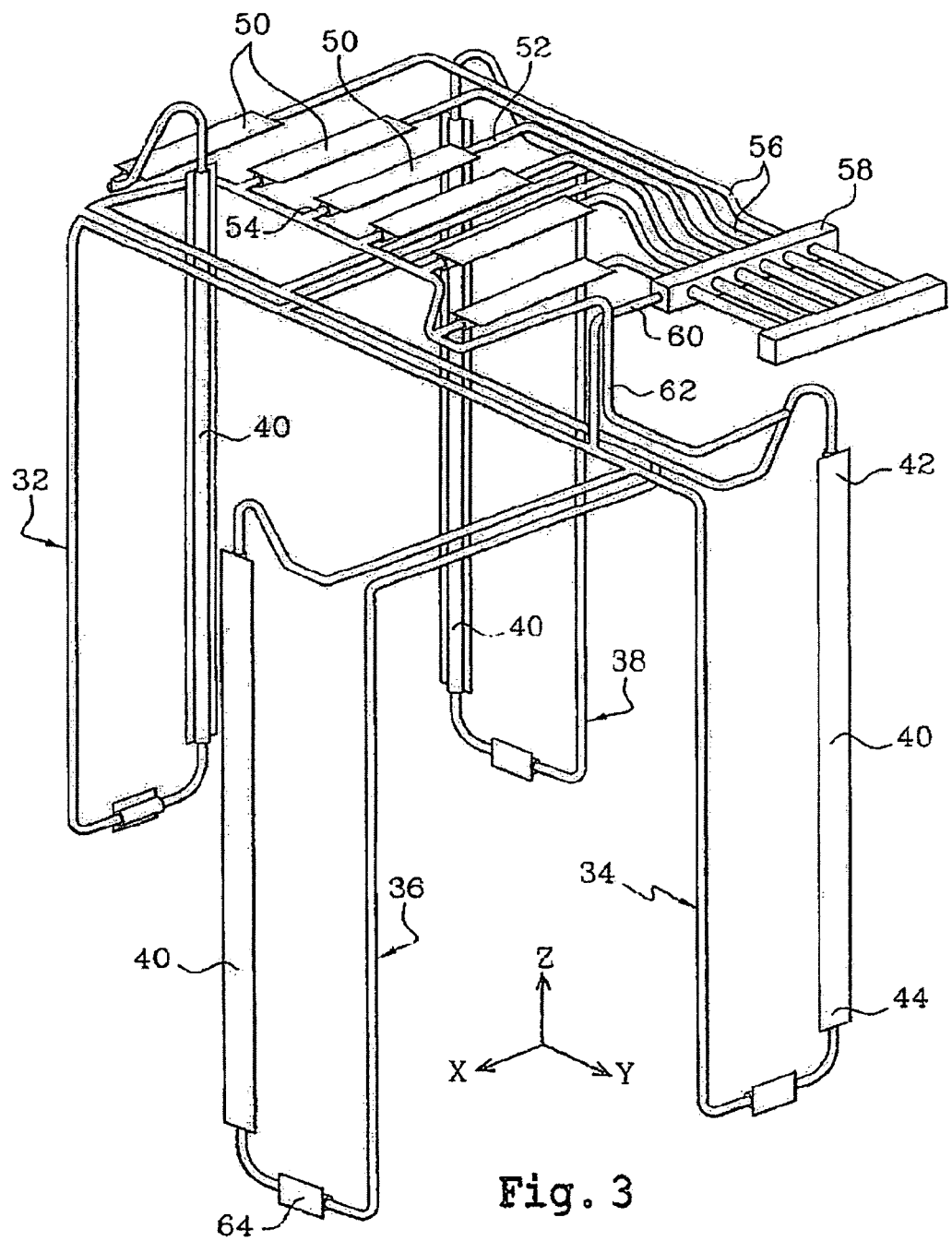
FIG. 3 is a perspective view of a multievaporator multicondenser fluid loop.

FIG. 3 is a perspective view of one particular embodiment of the fluid loop. It comprises a plurality of evaporators 50 (six of them in the example shown) in thermal contact with the shelf 30 (not shown) and therefore with the equipment. The evaporators 50 have an inlet 52 and an outlet 54 for the heat exchange fluid. The inlets 52 are connected to pipes 56 connected to a storage tank 58. The storage tank is supplied with fluid via an inlet pipe 60. The outlets 54 are connected to a pipe 62 connected to the inlet 42 of each of the condensers 40.

An isolator 64 at the outlet 44 of each condenser 40 blocks any vapor that has not yet been fully condensed. The system operates in such a way that the vapor generated by the evaporators preferably condenses in the colder branches. This provides thermal coupling of the north, south, east and west radiator panels, which attenuates their thermal gradient.

Figure 4:
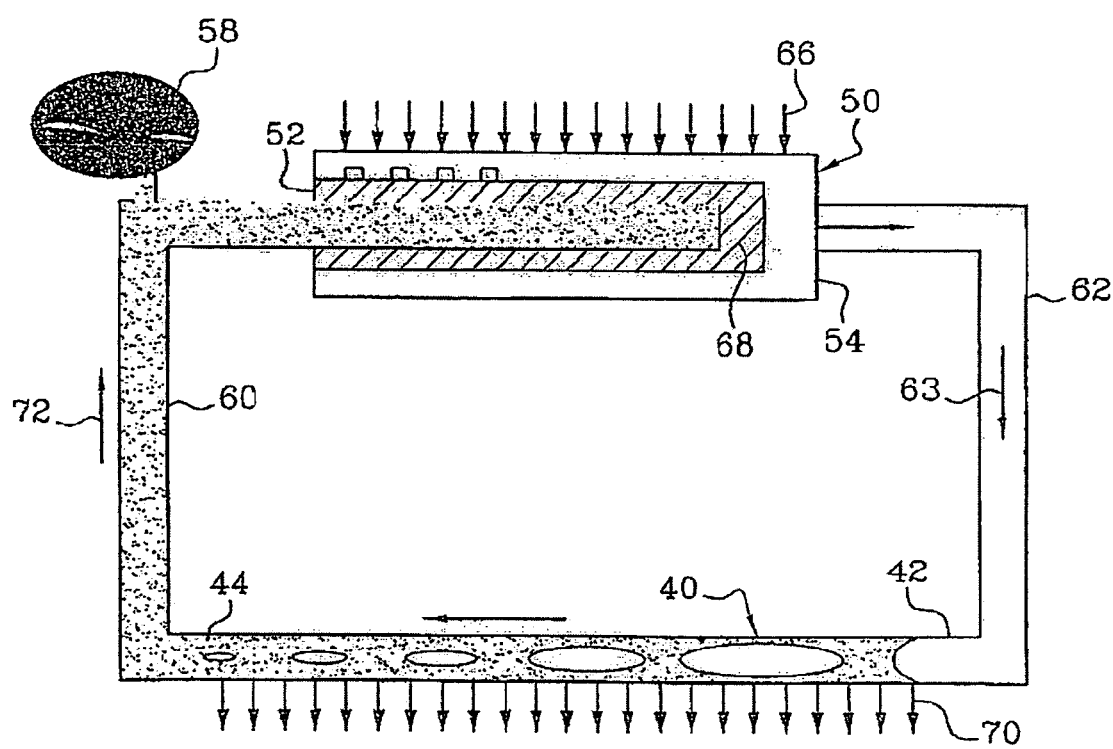
FIG. 4 is a theoretical diagram explaining the operation of a capillary pumped two-phase fluid loop.

FIG. 4 is a diagram depicting the operation of a capillary pumped two-phase loop. A thermal load symbolized by the arrows 66 is applied to the evaporator 50. In the context of the invention, it is generated by the equipment to be cooled. The heat dissipated by the equipment evaporates the fluid in the liquid state contained in the capillary 68. The vapor produced leaves the evaporator via the evaporator line 62 and reaches the condenser 40 (arrow 63). In condensing, it cedes its heat to the radiator panel to which the condenser is attached, as symbolized by the arrows 70, causing the condensation of the fluid, which returns to the liquid state. The radiator panel radiates the heat it has received into space. The fluid returns to the evaporator via the liquid line 60 (arrow 72). The storage tank 58 at the inlet of the evaporator ensures a continuous supply of liquid to the evaporator to prevent the loop from cutting out.

Figure 5:
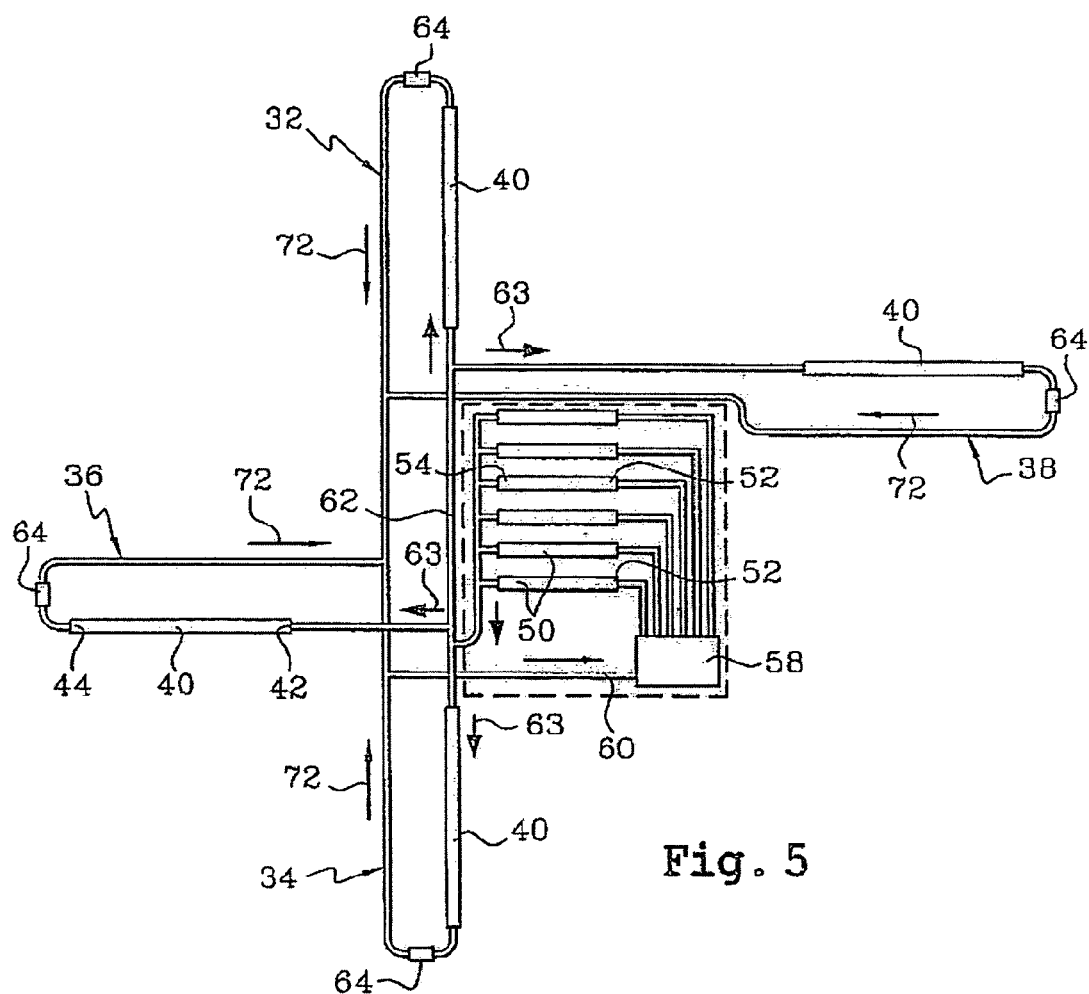
FIG. 5 is a diagrammatic view of the FIG. 3 fluid loop laid flat.

The operation of the fluid loop depicted in FIGS. 3 and 5 is based on that of the FIG. 4 fluid loop. However, it comprises six evaporators to collect dissipated heat from six items of equipment dispersed over the shelf. Furthermore, it comprises a branch including a condenser for each of the radiator panels. As there are four radiator panels (north, south, east and west), there are four branches 32, 34, 36 and 38, respectively. These branches are in parallel at the ends 52 and 54 of the evaporators 50.

According to one advantageous feature of the invention, the vapor produced by the evaporators 50 is not distributed equally between the condensers. It is condensed efficiently only at the colder points and with a low efficiency at the hottest point. This assures simultaneous thermal coupling of the four radiator panels, thereby reducing their thermal gradients. Accordingly, it is always the colder faces that are used to cool the equipment, anywhere on the orbit of the satellite around the Earth.

Figure 6:
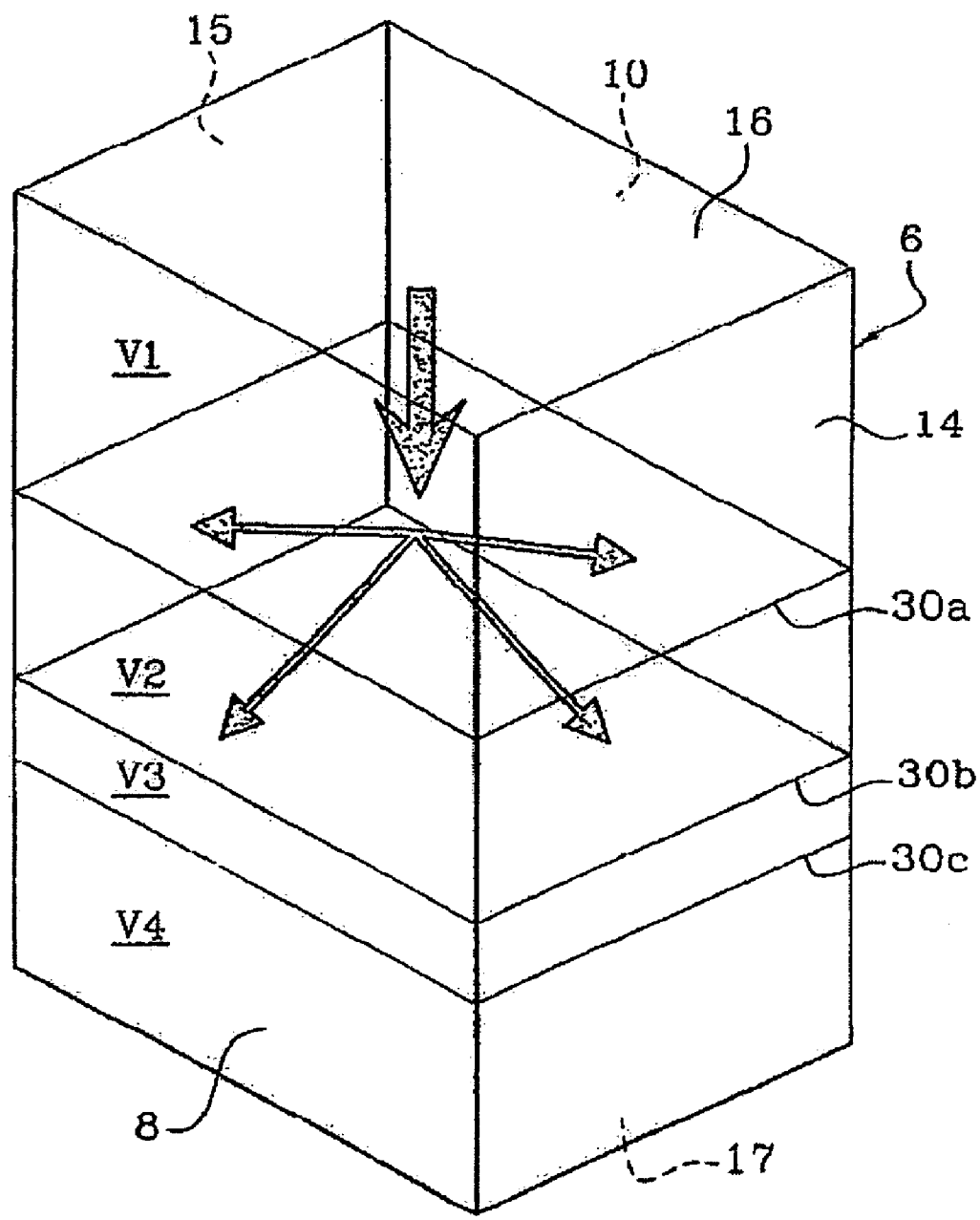
FIG. 6 is a diagrammatic perspective view of a satellite conforming to the invention and comprising a plurality of shelves.

FIG. 6 shows an embodiment of the invention comprising a plurality of shelves. In this embodiment, there are three shelves (30a, 30b and 30c). Each shelf supports equipment. A separate fluid loop is provided for each shelf. Thus the internal volume of the structure 6 is divided into four subvolumes V1, V2, V3 and V4 that can operate at different temperatures.

There is claimed:

1. A satellite, in particular a telecommunication satellite, intended to be placed in a geostationary orbit, and comprising a structure having a north face and a south face oriented perpendicularly to the rotation axis of the Earth and an east face and a west face that are periodically exposed to solar radiation as the satellite orbits the Earth, said structure supporting equipment dissipating heat, the north, south, east and west faces comprising radiator panels that radiate into space heat dissipated by the equipment, and said satellite comprising at least one shelf to support said equipment and heat transfer means for transferring heat dissipated by said equipment to said north, south, east and west radiator panels;

wherein said heat transfer means comprises at least one capillary pumped two-phase fluid loop; and wherein said fluid loop comprises at least one evaporator having an inlet and an outlet for a heat exchange fluid thermally connected to said equipment supported by said shelf, and four heat exchange fluid circulation branches each having one end connected to said inlet and one end connected to said outlet of said at least one evaporator, one of said heat exchange fluid circulation branches associated with each of said north, south, east and west faces, and each branch comprising a heat exchange fluid condenser thermally connected to the face with which said branch is associated.

2. The satellite claimed in claim 1 wherein each heat exchange fluid circulation branch further comprises an isolator at the outlet of its condenser to block uncondensed vapor.

3. The satellite claimed in claim 1 wherein said shelf is parallel to a face of said structure facing the Earth.

4. The satellite claimed in claim 1 comprising a plurality of shelves for supporting equipment and a fluid loop for each shelf.

5. A satellite comprising:
a satellite body supporting equipment;
at least four sides of the satellite body comprising radiator panels;

a capillary pumped two-phase fluid loop comprising an evaporator thermally connected to the equipment and a fluid circulation branch associated with each of the radiator panels;

wherein each branch is connected to an inlet and an outlet of the evaporator and comprises a condenser thermally connected to the radiator panel associated with the branch.

6. The satellite of claim 5, wherein the fluid loop comprises a plurality of evaporators and each branch is connected to the inlets and the outlets of the plurality of evaporators.

7. The satellite of claim 5, wherein the satellite body comprises six sides; the six sides comprise north, south, east, west, earth and anti-earth faces; and the north, south, east and west faces comprise the radiator panels.

8. The satellite of claim 5, wherein each of the branches further comprises an isolator at the outlet of the condenser.

9. The satellite of claim 5, wherein the satellite body further comprises a shelf and the shelf supports the equipment.

10. The satellite of claim 9, wherein one of the sides of the satellite body faces the Earth and the shelf is parallel to the side facing the Earth.

11. The satellite of claim 5, wherein the satellite body further comprises a plurality of shelves supporting the equipment and a fluid loop for each shelf.

12. The satellite of claim 5, wherein the satellite is a telecommunication satellite placed in a geostationary orbit.

13. A satellite comprising:

a satellite body with six sides, the satellite body supporting equipment;

at least four of the sides comprising heat radiators that radiate heat into space;

a fluid heat exchanger that transfers heat from the equipment to the heat radiators;

wherein the fluid heat exchanger comprises an evaporator for evaporating a fluid, the evaporator being thermally connected to the equipment, and further comprising at least one fluid circulation branch that circulates the fluid, associated with each of the heat radiators.

14. The satellite of claim 13, wherein each branch is connected to an inlet and an outlet of the evaporator and comprises a condenser that condenses the liquid, the condenser of each branch being thermally connected to the radiator panel associated with the branch.

15. The satellite of claim 13, wherein the satellite body comprises six sides; the six sides comprise north, south, east, west, earth and anti-earth faces; and the north, south, east and west faces each comprises one of the heat radiators.

16. The satellite of claim 13, wherein each of the branches further comprises an isolator at the outlet of the condenser that blocks vapor that has not been fully condensed.

17. The satellite of claim 13, wherein the satellite is a telecommunication satellite placed in a geostationary orbit.

* * * * *